Figures 1, 2:
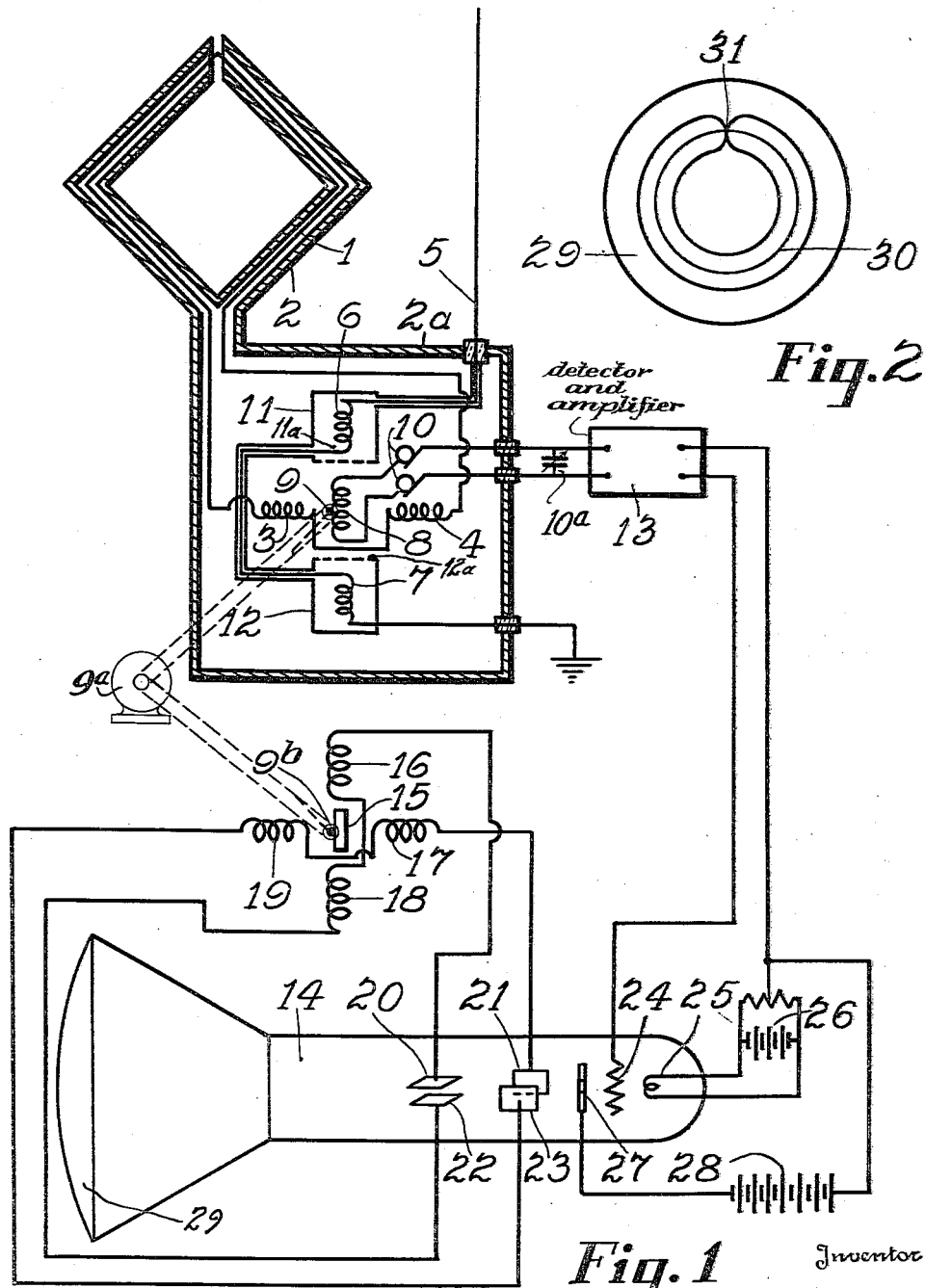

Dec. 19, 1939.   L. A. HYLAND   2,183,746
RADIO APPARATUS
Filed Aug. 3, 1935

Inventor
Lawrence A. Hyland
By Ben J. Chromy
Attorney

Patented Dec. 19, 1939

2,183,746

UNITED STATES PATENT OFFICE 2,183,746

RADIO APPARATUS

Lawrence A. Hyland, Washington, D. C.

Application August 3, 1935, Serial No. 34,611

8 Claims. (Cl. 250—11)

This invention relates to radio apparatus generally. More particularly this invention relates to radio signal receivers employing visual indicator apparatus for indicating the intensity characteristics of signals received on a directional antenna or antennas.

An object of this invention is to provide a signal receiver, sensitive to radiant energy, with a visual indicator adapted to indicate continuously the intensity of signaling energy received over a uni-laterally selective antenna system as the coupling between the antenna system and the receiver is varied.

Another object of this invention is to provide a radiant energy signal receiver having a visual indicator adapted to indicate continuously the intensity of the signal energy being received from a given transmitting station and the direction of that station.

Still another object of this invention is to provide directional energy signal receiver having a visual indicator adapted to indicate continuously the intensity and direction of signal energy being received on a given frequency channel.

A further object of this invention is to provide a radiant energy signal receiver with a cathode ray tube indicator and a uni-laterally selective antenna system adapted to be variably coupled to the receiver, said tube indicator having an arrangement for rotating the cathode ray beam simultaneously as the said coupling is varied.

Still another object is to provide a radiant energy signal receiver with a cathode ray indicator in which the intensity and position of the beam image on the indicator screen is controlled to indicate the direction or bearing of a given or selected transmitting station.

Other and further objects of this invention will be apparent from the following description of an embodiment thereof and the following claims.

According to this invention, I employ a signal receiver for receiving radiant energy of any predetermined frequency and employing a directional antenna, such as, a loop or combined loop and non-directional antenna for the purpose of energizing a radiant indicator which indicates the direction from which the signals are received. The output of the receiver is impressed upon selected electrodes of a cathode ray tube or similar device having a screen for rendering the beam or ray of the tube visible. Coupling arrangement is provided to the antenna for generating a pulsating or alternating electrical potential as the antenna coupling is varied. This potential is applied to the deflecting electrodes of the cathode ray tube for causing the beam of the tube to describe a circular or elliptical figure on the screen of the tube as the said antenna coupling is rotated or otherwise varied. The signal energy received by the antenna is then impressed upon the cathode ray tube in any suitable way to modulate the beam of the tube and indicate the signal energy received at the exact instant it is received.

Further details of the operation and construction of an embodiment of my invention will be set forth more fully in the following description and the drawing, in which briefly, Fig. 1 illustrates a schematic diagram of connections embodying this invention and Fig. 2 illustrates a signal intensity pattern obtained in accordance with this invention.

Referring to the drawing in detail reference numeral 1 designates a loop antenna substantially enclosed in a shielding housing 2. One end of the loop 1 is connected to the goniometer field coil 3 and the other end is connected to the field coil 4. A substantially non-directional antenna 5 is connected to the coils 6 and 7 which are positioned at an angle with respect to the field coils 3 and 4. The coils 3, 4, 6 and 7 are disposed around the coupling search coil 8 which is rotatable on the shaft 9 and is adapted to be coupled to the aforesaid coils and receive signal energy therefrom. The coils 6 and 7 are positioned in suitable shields 11 and 12 of metallic material and the ends 11a and 12a of these shields, adjacent to the rotating coil 8, may be formed of perforated metallic material, screen and the like, to permit coupling between the coils 6 and 7 and the coil 8. The ends 11a and 12a may be adjustable so as to control the degree of coupling between the coils 6 and 7 and the coil 8 and in that manner more or less equalize the magnitude of the signal energy transferred from the coils 6 and 7 to the coil 8.

The coils 3, 4, 6, and 7 produce a resultant electromagnetic field which is cut by the rotating coil 8. This resultant field depends upon the magnitude of the signal energy impressed upon the circuits of these coils, that is, the coils 3 and 4, which form the loop energized group and the coils 6 and 7 which form the non-directional antenna group. The magnetic fields set up by the coils 3, 4, 6, and 7 react together and produce a resultant magnetic force which is cut by the rotating coil 8.

All of the coils 3, 4, 6, 7 and 8 are mounted in a metallic container or shield 2a which is attached to the loop shield 2. It is, of course, not necessary to attach the loop shield 2 directly to the container 2a inasmuch as the connecting leads from the loop to the coils 3 and 4 may be brought through a suitable pipe or conduit in cases where the loop is remote from the coil system.

I have shown the inductance coupling coils 6 and 7 mounted in housing shields 11 and 12 for the purpose of reducing the coupling between these coils and the coils 3, 4, and 8. This is not necessary if the signal pick-up efficiency of the antenna 5 is substantially the same as that of the loop 1. However, in cases where the antenna 5 intercepts signal energy more efficiently, it would overcome the effect of the signal energy received by the loop and the resultant magnetic field produced around the coil 8 would be substantially the same as if the coils 6 and 7 were acting alone. The shields 11 and 12 reduce the field set up by the coils 6 and 7. The resultant field produced by all the coils 3, 4, 6, and 7 is thus made to be approximately the same magnitude as if these coils were energized at the same signal energy levels.

Slip rings and brushes 10 are connected to the rotatable coil 8 and connections are provided between the brushes and the detecting apparatus 13, which includes one or more electrical discharge devices adapted to amplify the signal impressed on the input thereof from the antenna system. The output of the amplifier 13, which may be either radio or audio frequency energy modulated in accordance with signals, is impressed upon the control electrode 24 and cathode 25 of the cathode ray tube 14.

The cathode ray tube 14 is provided with an anode 27 which is connected to the source of current supply 28. Additional anodes may be provided to the cathode ray tube for the purpose of focusing and accelerating the cathode ray beam if desired and where the beam is to be highly accelerated to give an extremely bright image or signal pattern on the screen 29, additional accelerating anodes are provided preferably in the space between the deflector plates 20 and 22 and the screen 29.

A generator employing a rotatable permanent magnet 15, mounted on the shaft 9 on which the coil 8 is also mounted, and fixed coils 16, 17, 18 and 19, are used as a source of alternating or pulsating potential for the deflector plates of the cathode ray tube 14. Suitable driving means such as motor 9a may be supplied for driving search coil 8 and permanent magnet 15 in synchronism.

The windings 16 and 18 are connected together and across the deflector plates 20 and 22. The windings 17 and 19 are connected together and across the deflector plates 21 and 23. Thus when the magnet 15 is rotated, simultaneously with the signal coupling coil 8, a varying potential is applied to the deflector plates of the cathode ray tube 14 and the cathode ray beam is caused to describe a circular or elliptical path 30 over the screen 29, as illustrated in Fig. 2.

The operation of the apparatus of my invention is as follows:

As the coupling coil 8 is rotated signaling energy that is the resultant of the pick-up effect of the loop and non-directional antenna is impressed upon the input of the amplifier 13. Simultaneously the cathode ray beam of the cathode ray tube 14 is rotated through the operation of the rotating magnet 9b and the beam of the tube 14 is modulated in accordance with the signal energy received. A pattern, such as illustrated in Fig. 2 is exhibited on the screen 29. This pattern illustrates the minimum signal intensity point 31 which is obtained by using the loop and non-directional antennas together. If the non-directional antenna is disconnected from the coupling coils 6 and 7 the pattern received on the screen would be one having two minimum points spaced by 90 degrees from the point 31 and on each side thereof.

It will, of course, be apparent that the direction or sense of the signal received can be determined readily from observing the screen 29 on which the signal intensity pattern is exhibited.

By tuning the condenser 10a or other condensers connected at suitable or convenient places in the circuits of the antennas, or in the circuits of the amplifier 13, signals of different frequencies may be received and bearings with respect to several different stations obtained.

Various modifications in the details of the apparatus of my invention, as set forth in the foregoing may be made without departing from the scope and spirit thereof and I, therefore, do not desire to limit this invention to the exact details described except insofar as those details are defined by the claims.

What I claim and desire to secure by Letters Patent is as follows:

1. In radio receiving apparatus adapted to determine direction, sense or bearing with respect to radio transmitter, the combination of a loop antenna and a substantially non-directional antenna, amplifying means having input and output circuits, means for coupling said antennas to the input circuit of said amplifying means, means for periodically varying said coupling means, a cathode ray tube, means for rotating the cathode ray beam of said tube, means for operating the said coupling means in predetermined time relation with the rotation of cathode ray beam, and means for modulating said beam in accordance with signals derived from said amplifying means.

2. In radio receiving apparatus adapted to determine direction, sense or bearing with respect to radio transmitter, the combination of a loop antenna and a substantially non-directional antenna, amplifying means having input and output circuits, rotatable and variable coupling means connected between said antennas and said amplifying means input circuit, a cathode ray tube connected to the output circuit of said amplifying means for modulating the beam of said tube according to signal energy received, and, means for rotating the cathode ray beam of said tube in predetermined time relation with the rotation of said rotatable coupling means.

3. In radio receiving apparatus adapted to determine direction, sense or bearing with respect to a radio transmitter, the combination of a loop antenna and a substantially non-directional antenna, amplifying means having input and output circuits, inductance units connected to each of said antennas, a rotatable inductance adapted to be coupled to said inductance units and connected to the input circuit of said amplifying means, a cathode ray tube, means for producing a rotating field for rotating the cathode ray beam of said tube in predetermined time relation with the rotation of said rotatable inductance and means connected to the output of said amplifying means for modulating said beam in accordance with signal energy as said beam is rotated.

4. In radio receiving apparatus adapted to determine direction, sense or bearing with respect to a radio transmitter, the combination of a loop antenna and a substantially non-directional antenna, amplifying means having input and output circuits, means for coupling said antennas to the input circuit of said amplifying means, means for periodically varying said coupling means, a cathode ray tube, means for producing a rotating field for rotating the cathode ray beam of said tube, means for operating said coupling means in predetermined time relation with the rotation of said cathode ray beam, and means for modulating said beam in accordance with signals derived from said amplifying means.

5. In radio receiving apparatus adapted to determine direction, sense or bearing with respect to a radio transmitter, the combination of a loop antenna and a substantially non-directional antenna, amplifying means having input and output circuits, means for coupling said antennas to the input circuit of said amplifying means, means for periodically varying said coupling means, a cathode ray tube, means for producing a plurality of alternating currents, means for developing a rotating field from said alternating currents for rotating the cathode ray beam of said tube, means for varying said coupling means in predetermined time relation with the rotation of cathode ray beam, and means for modulating said beam in accordance with signals derived from said amplifying means.

6. In radio receiving apparatus the combination of a directional antenna system, a cathode ray tube, means for controlling the cathode ray of said tube in accordance with signal energy received over said antenna system, means for varying the coupling between said first means and said antenna system, a generator connected for generating a rotating electric field as said antenna coupling means is varied, means for controlling the beam of said cathode ray tube in accordance with said rotating field and for simultaneously varying said coupling varying means.

7. In radio receiving apparatus the combination of a directional antenna system, variable coupling means connected to said antenna system, a generator for generating polyphase electric currents, means for coupling the rotor of said generator to said variable coupling means for operating said generator in predetermined time relation with said variable antenna coupling means, an electric discharge device having a plurality of electrodes, means for impressing said polyphase electric currents on said electrodes for producing a rotating electric discharge in said discharge device and means connected to said directional antenna variable coupling means for controlling said electric discharge in accordance with signaling energy intercepted by said antenna.

8. In a radio direction finder, a goniometer having a plurality of field coils and a search coil, a directional antenna connected to one of said field coils, a non-directional antenna connected to another of said field coils, signal receiving means connected to said search coil, means for generating voltages in a determined phase order with respect to the rotation of said search coil, a cathode ray tube connected to the output of said signal receiving means and having its beam modulated thereby, and means for deflecting the beam of the cathode ray tube in phase with the voltages generated by said means for generating voltages.

LAWRENCE A. HYLAND.